United States Patent
Kogan et al.

(10) Patent No.: US 11,302,284 B2
(45) Date of Patent: Apr. 12, 2022

(54) FOCUS ASSIST MODE FOR USER INTERFACES

(71) Applicant: Microsoft Technology Licensing, LLC, Redmond, WA (US)

(72) Inventors: Lily Kogan, Sammamish, WA (US); Christopher Dee Elvoid Walker, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/746,418

(22) Filed: Jan. 17, 2020

(65) Prior Publication Data

US 2021/0225321 A1   Jul. 22, 2021

(51) Int. Cl.
| G09G 5/10 | (2006.01) |
| G09G 5/02 | (2006.01) |
| G06F 3/0481 | (2022.01) |
| G09G 5/36 | (2006.01) |

(52) U.S. Cl.
CPC ............. *G09G 5/02* (2013.01); *G06F 3/0481* (2013.01); *G09G 5/10* (2013.01); *G09G 5/363* (2013.01); *G09G 2320/0666* (2013.01); *G09G 2320/0686* (2013.01); *G09G 2354/00* (2013.01)

(58) Field of Classification Search
CPC ............... G06F 1/3215; G06F 1/3265; G09G 2320/0626; G09G 2320/0686; G09G 2330/021; G09G 3/20; G09G 3/3208; G09G 3/3406; G09G 3/3426; G09G 5/00; H04W 52/027; Y02D 10/00; Y02D 10/153; Y02D 30/70; Y02D 70/1224; Y02D 70/1242; Y02D 70/142; Y02D 70/26
See application file for complete search history.

(56) References Cited

U.S. PATENT DOCUMENTS

| 6,579,324 B1 | 6/2003 | Lowry et al. |
| 7,036,025 B2 | 4/2006 | Hunter |
| 8,443,297 B1 | 5/2013 | Jitkoff et al. |
| 8,687,840 B2 | 4/2014 | Samanta Singhar |
| 9,268,875 B2 | 2/2016 | Campbell et al. |

(Continued)

OTHER PUBLICATIONS

"Reader View", Retrieved from: https://chrome.google.com/webstore/detail/reader-view famoacgcllloekhmdphdinpheeoiiphf?hl=en, Retrieved Date: Oct. 30, 2019, 12 Pages.

(Continued)

*Primary Examiner* — Insa Sadio

(57) ABSTRACT

Systems, methods, and software are disclosed herein for enhancing the aesthetics of user interfaces. In an implementation, a method comprises a computing apparatus receiving a command to transition a user interface to a focus assist mode. In response to the command, the computing apparatus changes an aesthetic of components of the user interface from a light aesthetic to a dark aesthetic. The method continues with receiving a subsequent command to focus on one or more of the components, in response to which the computing apparatus changes the aesthetic of the one or more of the components from the dark aesthetic to the light aesthetic, thereby allowing a user to focus on the lightened aspects of the interface.

20 Claims, 9 Drawing Sheets

(56) References Cited

U.S. PATENT DOCUMENTS

| | | |
|---|---|---|
| 9,367,117 B2 | 6/2016 | Timm et al. |
| 9,836,119 B2 | 12/2017 | Plowman |
| 10,324,525 B2 | 6/2019 | Sharma et al. |
| 2003/0052903 A1 | 3/2003 | Weast |
| 2007/0146344 A1 | 6/2007 | Martin et al. |
| 2013/0050178 A1* | 2/2013 | Park ................ G09G 3/002 345/214 |
| 2017/0269632 A1* | 9/2017 | Chadwick ........... G06F 1/163 |
| 2019/0182371 A1 | 6/2019 | Ashall et al. |

OTHER PUBLICATIONS

Gudger, Gare Ih, "Improved Dark Mode in Outlook for Windows", Retrieved from: https://supertekboy.com/2019/07/04/improved-dark-mode-in-outlook-for-windows/, Jul. 4, 2019, 21 Pages.

"International Search Report and Written Opinion Issued in PCT Application No. PCT/US20/064143", dated Mar. 16, 2021, 11 Pages.

* cited by examiner

FOCUS ASSIST MODE FOR USER INTERFACES

TECHNICAL FIELD

Aspects of the disclosure are related to computing devices and software applications, and in particular, to enhanced user interfaces.

TECHNICAL BACKGROUND

User interface design relates to the task of producing interfaces that make it pleasant and easy for humans to interact with computers. A user interface may include many different layers such as a touch layer, a visual layer, and an auditory layer, all of which combine to allow users to interact with the software running on a computer.

Unfortunately, many user-interface designs especially at the visual layer have aesthetics that are distracting or even overwhelming to end users. For example, a user interface with many components or a great deal of information may make it difficult for a user to focus on a given task or area of the user interface. Such design problems may be found in individual applications as well as the shell environments provided by operating systems. People with autism and sensory processing disorders may find some designs especially disagreeable.

A response to such challenges has been to streamline the user interface. For example, some applications include various modes with different levels of complexity and distraction, including an in-focus mode that reduces the visual clutter in the user interface. A problem with this approach is that eliminating the clutter by hiding menus or functions can make them difficult to find when needed, further exacerbating a user's frustration.

With respect to operating system shells, various tools exist that allow a user to customize the user experience so as to improve their focus or otherwise improve their experience. For example, some operating systems provide accessibility features to assist users with navigating a user interface such as a narrator feature and a magnifier. In other examples, a user can adjust the brightness settings on their computer, change the contrast, or even turn on color filters to accentuate different aspects of the user experience to their liking. However, such settings apply system-wide and with uniformity within applications.

OVERVIEW

Technology disclosed herein relates to enhanced aesthetics for user interfaces that improve the ability of users to focus. In an implementation, a method comprises a focus assist process employed on a computing apparatus receiving a command to transition a user interface to a focus assist mode. In response to the command, the computing apparatus changes an aesthetic of components of the user interface from a light aesthetic to a dark aesthetic. The method continues with receiving a subsequent command to focus on one or more of the components, in response to which the computing apparatus changes the aesthetic of the one or more of the components from the dark aesthetic to the light aesthetic, thereby allowing a user to focus on the illuminated aspects of the interface.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, like reference numerals in the drawings designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Technology disclosed herein allows users to enter into a new focus assist mode with respect to a user interface on a computer. The new focus assist mode transitions the aesthetic of components of the user interface from a light aesthetic to a dark aesthetic. In some cases, all of the components of the user interface are transitioned to the dark aesthetic, while in other cases only some of the components are transitioned. The transition occurs in response to user input in the form of a command such as a touch gesture, a mouse click on a button, a spoken command, or any other type of user input.

Once in the focus assist mode, a subsequent command directs the computer to put the focus of the user interface on one or more of the components by changing the aesthetic of the component(s) from the dark aesthetic to the light aesthetic. In the case where all of the components were darkened, the subsequent command comprises a selection of one or more of the components to create a distinctive aesthetic separation between the selected component(s) and the remaining components of the user interface. In the case where only some of the components were darkened, the subsequent command has the effect of expanding or changing the focus that was already present by virtue of the earlier lightening.

The resulting combination of dark and light aesthetics has the technical effect of bringing some portion(s) of the user interface into greater visual relief than the others, thereby allowing the user to focus on the illuminated portion while retaining access to all of the features and information of the user interface. For example, the reading pane in the user interface to an email application may be presented with a lighter aesthetic than the inbox and other panels, allowing the user to focus visually on the reading pane without the distraction of the other components. In another example, a user may draw an area box around a portion of a user interface, thereby illuminating the encompassed area relative to a remainder of the user interface.

Figure 1:
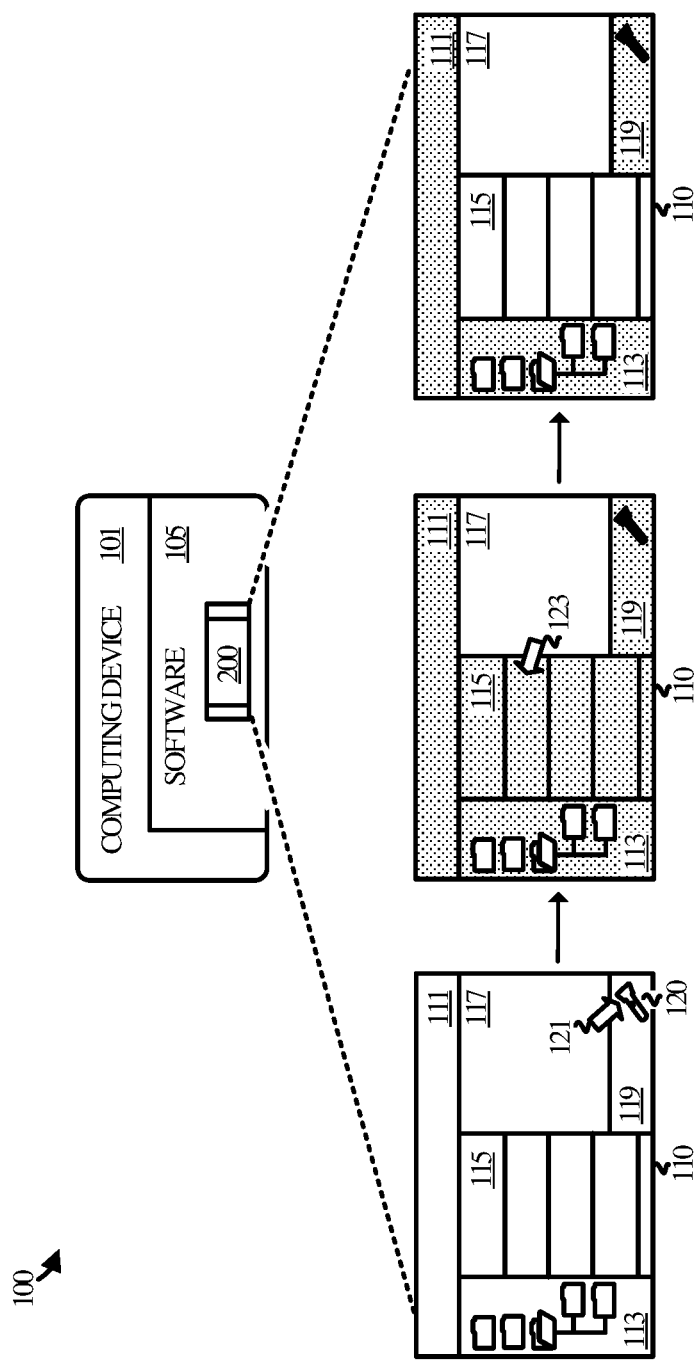
FIG. 1 illustrates an operational scenario in an implementation of focused aesthetics for user interfaces.
Figure 9:
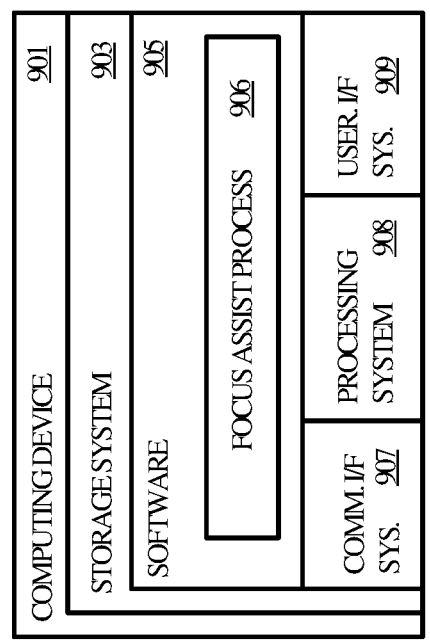
FIG. 9 illustrates a computing system suitable for implementing the various operational environments, architectures, processes, scenarios, and sequences discussed below with respect to the Figures.

Referring now to the drawings, FIG. 1 illustrates an operational scenario 100 in an implementation of enhanced aesthetics for user interfaces. Operational scenario 100 relates to a user experience with respect to computing device 101 as a user interacts with an enhanced user interface 110 provided by software 105 on the computing device. Examples of computing device 101—include but are not limited to—mobile phones, tablet computers, laptop computers, desktop computers, wearable devices (e.g. watches), and any other computing devices, combination of devices, or variation thereof. Computing device 101 may be implemented in accordance with any suitable computing architecture of which the architecture of computing device 901 in FIG. 9 is representative.

Figure 2:
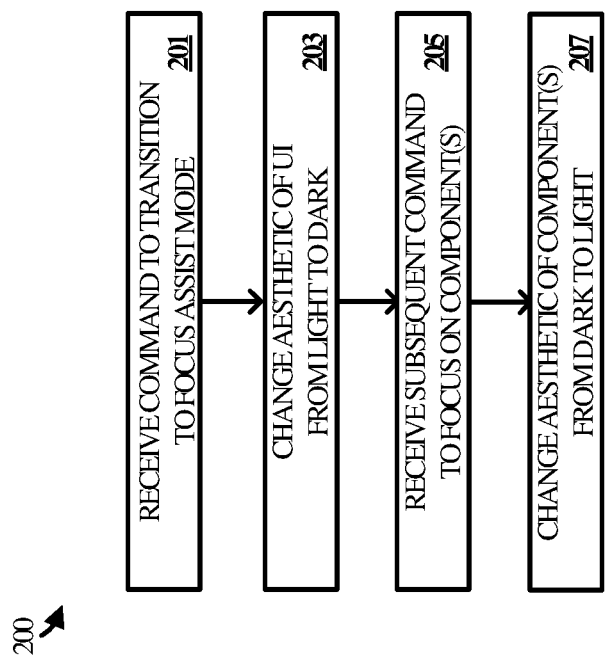
FIG. 2 illustrates a focus assist process in an implementation

Computing device 101 includes one or more user interface devices, systems, or sub-systems through which a user may interact with software 105. Software 105 is representative of one or more software applications, operating system features, or any combination thereof. Focus assist process 200, illustrated in FIG. 2, may be implemented in program instructions in the context of any of the modules, scripts, objects, code, or other such elements of software 105. The program instructions direct computing device 101 to operate as described for focus assist process 200, referring parenthetically to the steps in FIG. 2.

To begin, focus assist process 200 receives a command to transition user interface 101 to a focus assist mode (step 201). In this scenario, user interface 110 includes various components represented by component 111, component 113, component 115, component 117, and component 119. The components may be, for example, a feature menu (component 111), a navigation panel (component 113), an inbox (component 115), a reading pane (component 117), and a function bar (component 119). Component 119 includes a button 120 symbolizing a flashlight. Selection 121 represents a mouse click or touch gesture made with respect to button 120 and is representative of the command received in step 201. Other examples include voice commands, haptic gestures, automated commands (e.g. commands issued by an intelligent assistant or agent), and the like.

User interface 110 has as an initial aesthetic at the outset of focus assist process 200 that, for exemplary purposes, may be considered to exhibit a default or base lightness or illumination. The lightness exhibited by user interface 110 (or that experienced by the user) may be influenced by one or more characteristics of its components. Examples of such characteristics include but are not limited to the hues, shades, tints, tones contrast, shadows, and intensity of the colors of the components that, as they vary, give the effect of illuminating or darkening the user interface. The colors may be defined in terms of color values in a color space, examples of which include the red-green-blue (RGB) color space, the hue-saturation-lightness (HSL) color space, and the hue-saturation-value/brightness (HSV/B) color space, and the cyan-magenta-yellow-key/black (CMYK) color space.

When the command is received in step 201 to transition user interface 110 to the focus assist mode, focus assist process 200 changes the aesthetic of the user interface from the default illumination to a darker aesthetic (step 203). The changes may be made with respect to some or all of the components of user interface 110 and may be accomplished by changing the color values of the affected components. For instance, focus assist process 200 may change the RGB or HSL values associated with a given component from a beginning set of values to another set of values that give the component a darkened aesthetic relative to the beginning values. The values may be changed in a uniform manner for all of the affected components or may be changed to different degrees for each, so long as all of the affected components are darkened.

Not all of the components of user interface 110 need be darkened upon the transition to the focus assist mode. Rather, in some scenarios one or more components may retain their relative lightness. Their lightness may be maintained to the same degree as prior to the transition to the focus assist mode or their lightness may even be increased. The aesthetic of the unaffected components may even be darkened in some scenarios, although not to the same degree as the affected components in order to achieve the effect of focusing on the lighter (or less dark) component(s) of the user interface.

In fact, the scenario illustrated in FIG. 1 highlights a use case where all but one of the components of user interface 110 transition to a darkened aesthetic, while component 117 maintains an aesthetic of relative lightness. The relative lightness of component 117 enhances the ability of the user to focus on that component (e.g. a reading pane) while mitigating the distractions associated with the remainder of the user interface.

Subsequent to darkening some or all of user interface 110, focus assist process 200 receives a subsequent command to focus on one or more of the darkened components (step 205). The subsequent command may be communicated or initiated by a selection of the one or more darkened components, of which selection 123 is representative. Examples of such selections include mouse clicks, touch gestures, spoken commands, and the like.

Focus assist process 200 proceeds to change the aesthetic of the selected component(s) from the darkened aesthetic to a lighter aesthetic (step 207). In this example, the entire inbox is illuminated aesthetically, although a single email or event may be illuminated in other examples. In addition, component 117 remains aesthetically bright, although in other scenarios the subsequent command may also cause previously lightened components to "go dark." Focus assist process 200 may change the RGB or HSL values associated with a given component from one set of values to another set of values that give the component a lightened aesthetic. The values may be changed in a uniform manner for all of the affected components or may be changed to different degrees for each, so long as all of the affected components appear to have been illuminated.

Figure 3:
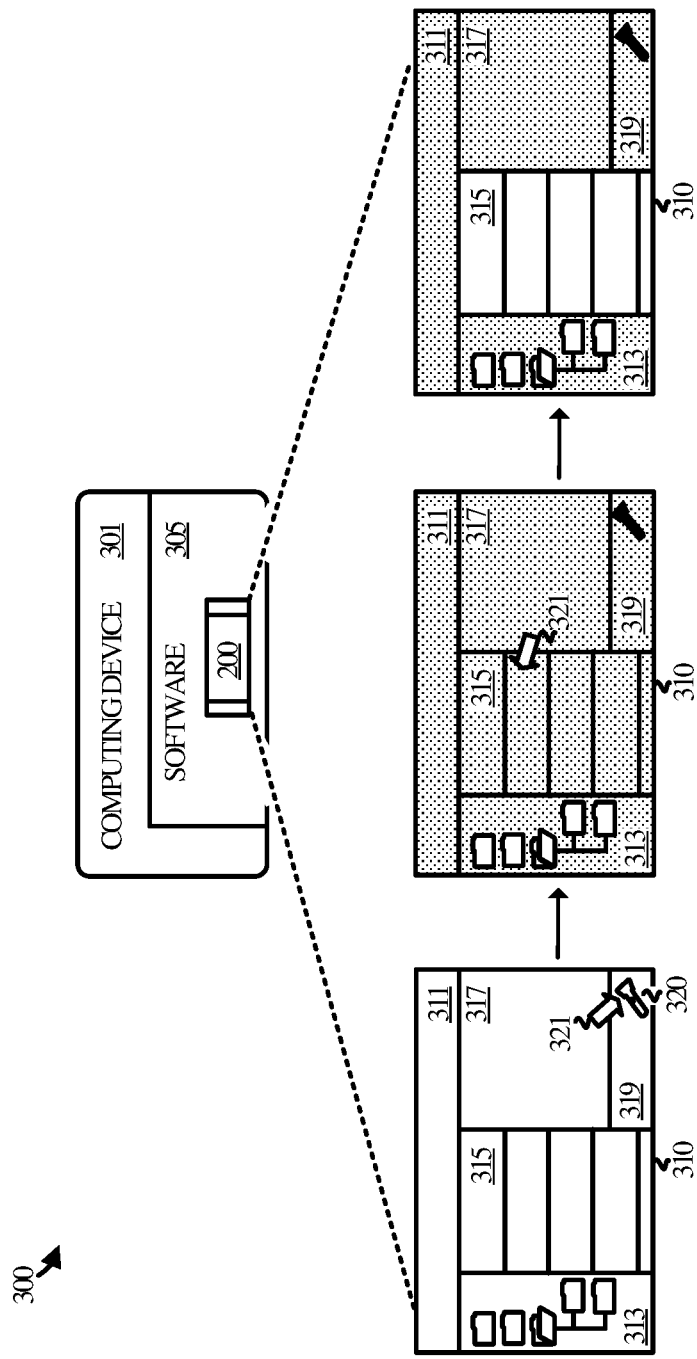
FIG. 3 illustrates another operational scenario in an implementation.

FIG. 3 illustrates an operational scenario 300 in another implementation of enhanced aesthetics for user interfaces. Operational scenario 300 relates to a user experience with respect to computing device 301 as a user interacts with a user interface 310 provided by software 305 on the computing device. Examples of computing device 301 include but are not limited to mobile phones, tablet computers, laptop computers, desktop computers, wearable devices (e.g. watches), and any other computing devices, combination of devices, or variation thereof. Computing device 301 may be implemented in accordance with any suitable computing architecture of which the architecture of computing device 901 in FIG. 9 is representative.

Computing device 301 includes one or more user interface devices, systems, or sub-systems through which a user may interact with software 305. Software 305 is representative of one or more software applications, operating system features, or any combination thereof. Focus assist process 200, illustrated in FIG. 2, may be implemented in program instructions in the context of any of the modules, scripts, objects, code, or other such elements of software 305 that implement its features. The program instructions direct computing device 301 to operate as described for focus assist process 200, although without explicit reference to the steps in FIG. 2.

To begin, an application represented by software 305 receives a command to transition user interface 310 to a focus assist mode. In this scenario, user interface 310 includes various components represented by component 311, component 313, component 315, component 317, and component 319. The components may be, for example, a feature menu, a navigation panel, an inbox, a reading pane, and a function bar respectively. Component 319 includes a button 320 symbolizing a flashlight. Selection 321 represents a mouse click or touch gesture made with respect to button 320 that triggers the command to transition to the focus assist mode. Other examples include voice commands, haptic gestures, automated commands (e.g. commands issued by an intelligent assistant or agent), key combinations, keyboard shortcuts, and the like.

User interface 310 has an initial aesthetic at the outset that exhibits a configured illumination. The lightness (or illumination) exhibited by user interface 310 (or that experienced by the user) may be influenced by one or more characteristics of its components. Examples of such characteristics include—but are not limited to—the hues, shades, tints, tones contrast, shadows, and intensity of the colors of the components that, as they vary, give the effect of lightening or darkening the user interface. The colors may be defined in terms of color values in a color space, examples of which include the red-green-blue (RGB) color space, the hue-saturation-lightness (HSL) color space, the hue-saturation-value/brightness (HSV/B) color space, and the cyan-magenta-yellow-key/black (CMYK) color space.

When the command is received by the application to transition user interface 310 to the focus assist mode, the application changes the aesthetic of the user interface from the current illumination to a darker aesthetic. In this scenario, the application changes all of the components of user interface 310, which is accomplished by changing the color values of the components. For instance, the application may decrease one or more of the RGB or HSL values associated with each of the components from a beginning set of values to another set of values that give the component a darkened aesthetic relative to the beginning values. The values may be changed in a uniform manner for all of the affected components or may be change to different degrees for each, so long as all of the affected components are darkened.

Subsequent to darkening or all of user interface 310, the application receives a subsequent command to focus on one or more of the darkened components. The subsequent command may be communicated or initiated by a selection of the one or more darkened components, of which selection 323 is representative. Examples of such selections include mouse clicks, touch gestures, spoken commands, and the like.

The application proceeds to change the aesthetic of the selected component(s) from the darkened aesthetic to a lighter aesthetic. In this example, the entire inbox is illuminated aesthetically, although a single email or event may be lightened in other examples. The application may increase the RGB or HSL values associated with a given component from one set of values to another set of values that give the component a lightened or illuminated aesthetic. The values may be changed in a uniform manner for all of the affected components or may be change to different degrees for each, so long as all of the affected components appear to have been lightened.

Figure 4:
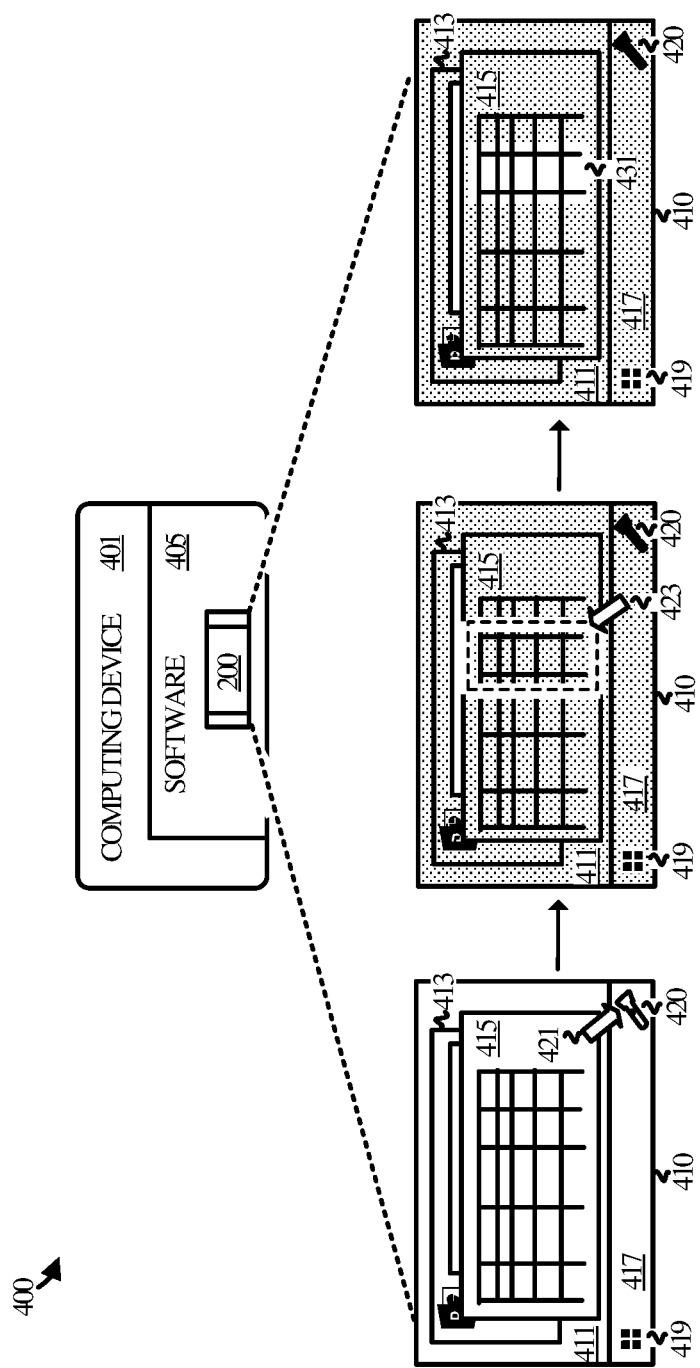
FIG. 4 also illustrates an operational scenario in an implementation.

FIG. 4 illustrates another operational scenario in an implementation of enhanced aesthetics for user interfaces. Operational scenario 400 relates to a user experience with respect to computing device 401 as a user interacts with a user interface 410 provided by software 405 on the computing device. Examples of computing device 401 include but are not limited to mobile phones, tablet computers, laptop computers, desktop computers, wearable devices (e.g. watches), and any other computing devices, combination of devices, or variation thereof. Computing device 401 may be implemented in accordance with any suitable computing architecture of which the architecture of computing device 901 in FIG. 9 is representative.

Computing device 401 includes one or more user interface devices, systems, or sub-systems through which a user may interact with software 405. Software 405 is representative of one or more software applications, operating system features, or any combination thereof. Focus assist process 200, illustrated in FIG. 2, may be implemented in program instructions in the context of any of the modules, scripts, objects, code, or other such elements of software 405. The program instructions direct computing device 401 to operate as described for focus assist process 200, although again without explicit reference to the steps in FIG. 2.

To begin, an operating system (represented by software 405) receives a command to transition user interface 401 to a focus assist mode. In this scenario, user interface 410 provides a shell within which a user may interact with the user interfaces of other applications. User interface 410 includes a desktop 411 as well as component 417 (a task bar) and component 419 (a start button). User interface 410 includes various other application user interfaces layered above the desktop 411, represented by user interface 413 and user interface 415. User interface 413 provides an interface to a presentation program, for example, whereas user interface 415 provides a user interface to a spreadsheet program.

The task bar 417 includes a button 420 in the shape of a flashlight that, when selected, triggers a transition of user interface 410 into a focus assist mode. Selection 421 represents a mouse click or touch gesture made with respect to button 420 that triggers a command to transition to the focus assist mode. Other examples include voice commands, haptic gestures, automated commands (e.g. commands issued by an intelligent assistant or agent), key combinations, keyboard shortcuts, and the like.

Initially, user interface 410 has an illuminated aesthetic influenced by one or more characteristics of its components. Examples of such characteristics include but are not limited to the hues, shades, tints, tones contrast, shadows, and intensity of the colors of the components that, as they vary, give the effect of lightening or darkening the user interface. The colors may be defined in terms of color values in one or more color spaces (e.g. RGB, HSL, etc.).

When the command is received by the operating system to transition user interface 410 to the focus assist mode, the operating system changes the aesthetic of the user interface from the light aesthetic to a darker aesthetic. In this scenario, the operating system changes all of the components of user interface 410 to the darker aesthetic, although only a portion of the components may be changed in other implementations.

The operating system may accomplish the transition by changing the color values of the components itself. In other cases, the operating system may request or instruct the applications associated with user interfaces 413 and 415 to change the color values of their components. A division of labor between the operating system and one or more applications is also possible, where the operating system changes the color values of some components, while the applications change the color values of other components. In any case, the darkening of the components may be accomplished by changing the RGB or HSL values associated with each of the components from one set of values that produce a light aesthetic to a second set of values that produce a dark aesthetic by comparison.

Subsequent to darkening some or all of user interface 410, the operating system receives a subsequent command to focus on one or more of the darkened components. The subsequent command may be communicated or initiated by a selection of the one or more darkened components, of which selection 423 is representative. Examples of such selections include a click-and-drag action with a mouse to draw a box around a portion the user interface, a touch gesture signifying the same, a voice command, or the like. Here, selection 423 is drawn around a group of cells on the spreadsheet in user interface 415.

The operating system proceeds to change the aesthetic of the selected component(s) from the darkened aesthetic to a lighter aesthetic. In this example, the area captured by selection 423 is lightened aesthetically. The operating system may change the color values of the components encompassed by selection 423 or it may request or instruct the spreadsheet application to change the color values. In some implementations, selection 423 may encompass portions of more than one user interface, in which case the operating system could instruct multiple applications to change the color values of some of their components. The components may be lightened by changing the RGB or HSL values of the components from one set of values to another set of values that give the component a lightened aesthetic. The values may be changed in a uniform manner for all of the affected components or may be change to different degrees for each.

Figure 5:
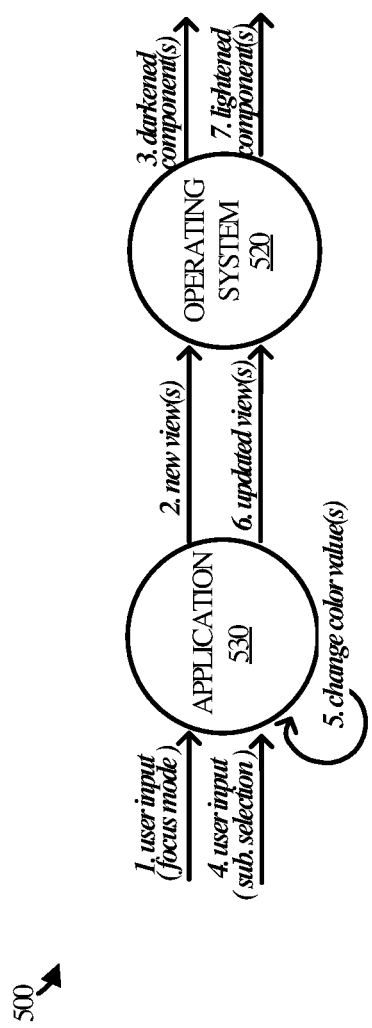
FIG. 5 illustrates an operational architecture and associated operations in an implementation.

FIG. 5 illustrates an operational architecture 500 in one implementation to demonstrate the flow of information and commands between an application 530 and an operating system 520. Operational architecture 500 includes application 530 and operating system 520. Application 530 is representative of any application having a user interface and capable of employing all or portions of focus assist process 200. Examples of application 530 include but are not limited to email applications, productivity applications, gaming applications, business applications, web browsers, reader applications, social networking applications, and the like.

In operation, a user engaged with application 530 through its user interface supplies user input to transition the user interface to a focus assist mode. Assuming for exemplary purposes that the user interface is initially in a default mode (or any other mode other than the focus assist mode), application 530 generates new views to replace the view of the present mode. The new views include darkened versions of the components of the user interface relative to their light aesthetic in the default mode. Application 530 may darken the components by specifying new color values in the views to operating system 520. Alternatively, application 530 could make a call to operating system 520 requesting that the colors be changed to non-focused variants of the color values, rather than specifying new color values and/or generating new views.

Operating system 520 receives the new views (or a request to darken the components) and displays the updated views with the darkened components on a display. It may be appreciated that operating system 520 may interact with or otherwise cooperate with other systems or sub-systems to display the new views.

Subsequent to having darkened all or portions of the user interface, the user supplies new user input to alter the state of the user interface in the focus assist mode. The new user input comprises a selection of one or more of the darkened components to change their aesthetic to lighter colors. Application 530 again generates the views with changed color values and sends the updated views to operating system 520. Operating system 520 receives the views and displays them on a screen with the selected components in a lightened state.

Alternatively, application 530 may lighten the components by specifying new color values in the views to operating system 520. Alternatively, application 530 could make a call to operating system 520 requesting that the colors be changed to focused variants of the color values, rather than specifying new color values and/or generating new views.

In some implementations, a user could remote-in to operating system 520 from a remote operating system, in which case the user input supplied by the user would be communicated by the remote operating system to operating system 520. Similarly, operating system 520 would send the modified views to the remote operating system to be displayed. Alternatively, the steps performed by operating system 520 in FIG. 5 could instead be performed by the remote operating system.

Figure 6:
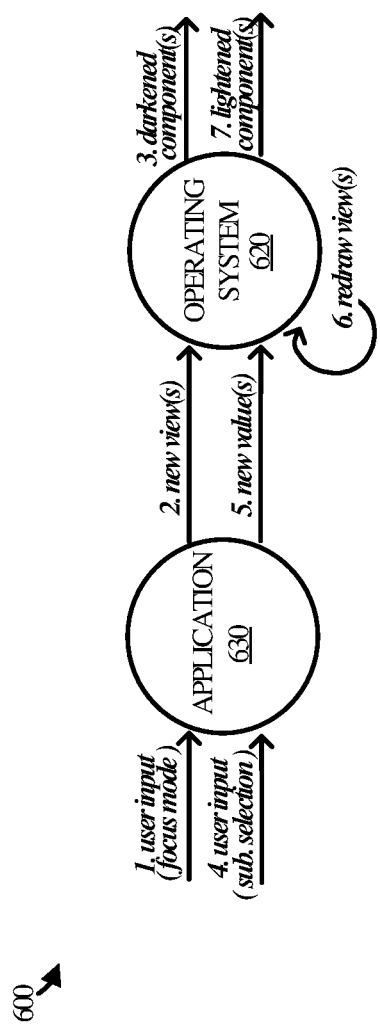
FIG. 6 illustrates an operational architecture and associated operations in an implementation.

FIG. 6 illustrates a similar operational architecture, but a slightly different flow of information and commands relative to FIG. 5. Operational architecture 600 includes application 630 and operating system 620. Application 630 is representative of any application having a user interface and capable of employing all or portions of focus assist process 200. Examples of application 630 include but are not limited to email applications, productivity applications, gaming applications, business applications, web browsers, reader applications, social networking applications, and the like.

In operation, a user engaged with application 630 through its user interface supplies user input to transition the user interface to a focus assist mode. Assuming for exemplary purposes that the user interface is initially in a default mode (or any other mode other than the focus assist mode), application 630 generates new views to replace the view of the present mode. The new views include darkened versions of the components of the user interface relative to their light aesthetic in the default mode. Alternatively, application 630 may send new color values to operating system 620 such that operating system 620 can redraw the views. Application 630 could also make a call to operating system 620 requesting that the components be changed to non-focused variants of their present color values, rather than specifying values.

Operating system 620 receives the new views and displays the new views with the darkened components on a display. It may be appreciated that operating system 620 may interact with or otherwise cooperate with other systems or sub-systems to display the new views and, as mentioned, may redraw or otherwise generate the new views itself. Alternatively, application 630 may lighten the components by specifying new color values in the views to operating system 620. Application 630 could also make a call to operating system 620 requesting that the colors be changed to focused variants of the color values, rather than specifying new color values and/or generating new views.

Subsequent to having darkened all or portions of the user interface, the user supplies new user input to alter the state of the user interface in the focus assist mode. The new user input comprises a selection of one or more of the darkened components to change their aesthetic to lighter colors. This time, application 630 sends the new values to operating system 620 for operating system 620 to incorporate into new views. Operating system 620 redraws the views with the updated (lightened) components and displays them on a screen.

In some implementations, a user could remote-in to operating system 620 from a remote operating system, in which case the user input supplied by the user would be communicated by the remote operating system to operating system 620. Similarly, operating system 620 would send the modified views to the remote operating system to be displayed. Alternatively, the steps performed by operating system 620 in FIG. 6 could instead be performed by the remote operating system.

Figure 7:
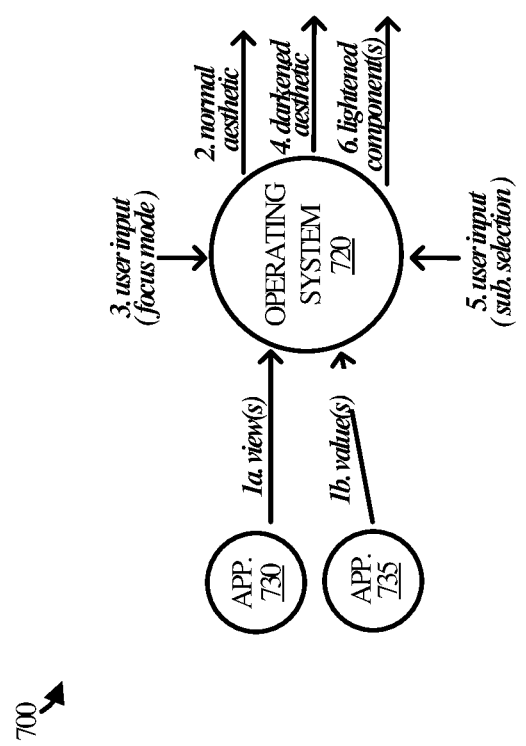
FIG. 7 illustrates an operational architecture and associated operations in an implementation.

FIG. 7 illustrates an operational architecture 700 in which an operating system 720 interacts with multiple applications, represented by application 730 and application 735. Applications 730 and 735 are each representative of any application capable of providing a user interface such as email applications, productivity applications, and the like, while operating system 720 represents any feature, utility, or other such component or module of an operating systems capable of providing a shell.

In operation, a user engages with both applications (not simultaneously) resulting in the display of their views on a screen by operating system 720. The views are assumed to be displayed with a base, default, or otherwise normal aesthetic.

The user then proceeds to provide user input to operating system 720 to transition the operating system shell to a focus assist mode. Operating system 720 responsively darkens some or all of the components within its purview including the user interface components of application 730 and application 735. Operating system 720 may accomplish this by changing the color values associated with the individual components and redrawing them to the screen.

The user then proceeds to supply subsequent user input to expand or otherwise place a lightened focus on a portion of the user interface. Operating system 720 receives the user input, determines which components are affected, and changes their color values accordingly. Some of the components are thus displayed with a lightened aesthetic relative to the dark aesthetic of the remaining components.

In some implementations, a user could remote-in to operating system 720 from a remote operating system, in which case the user input supplied by the user would be communicated by the remote operating system to operating system 720. Similarly, operating system 720 would send the modified views to the remote operating system to be displayed. Alternatively, the steps performed by operating system 720 in FIG. 7 could instead be performed by the remote operating system.

Figure 8:
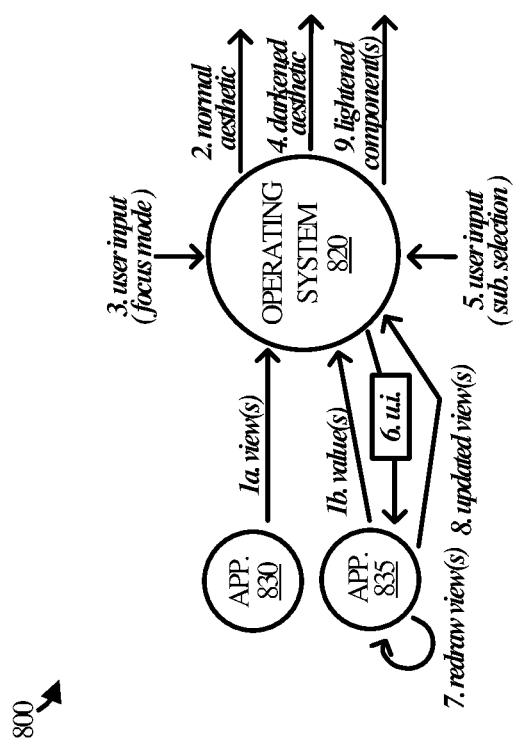
FIG. 8 illustrates an operational architecture and associated operations in an implementation.

FIG. 8 illustrates a final operational architecture in which an operating system 820 interacts with multiple applications, represented by application 830 and application 835. In operational architecture 800, applications 830 and 835 are each representative of any application capable of providing a user interface such as email applications, productivity applications, and the like, while operating system 820 represents any feature, utility, or other such component or module of an operating systems capable of providing a shell.

In operation, a user engages with both applications (not simultaneously) resulting in the display of their views on a screen by operating system 820. The views are assumed to be displayed with a base, default, or otherwise normal aesthetic.

The user then proceeds to provide user input to operating system 820 to transition the operating system shell to a focus assist mode. Operating system 820 responsively darkens some or all of the components within its purview including the user interface components of application 830 and application 835. Operating system 820 may accomplish this by changing the color values associated with the individual components and redrawing them to the screen. Alternatively, operating system 820 may communicate a request to applications 830 and 835 to redraw their user interfaces with some or all of the components in a darkened state.

The user then proceeds to supply subsequent user input to expand or otherwise place a lightened focus on a portion of the user interface. Operating system 820 receives the user input and communicates an indication of the user input to the affected application. In this case, it is assumed for exemplary purposes that the user input pertains to application 835—as opposed to application 830—a fact that operating system 820 may be aware of, thus allowing it to send the request to application 835, alone. Optionally, operating system 820 may send the request to both applications, allowing the applications to determine for themselves if the request is relevant to their individual user interfaces.

In this example, application 835 receives the request and proceeds to redraw its views with one or more of its components having a lightened aesthetic. Application 835 then sends the updated views to operating system 820 to be displayed in their lightened form on a display screen. Alternatively, application 835 may instead send updated color values to operating system 820 for the affected components, allowing operating system 820 to redraw the components in any suitable manner.

It may be appreciated that the scenarios described above may apply as well to remote desktop situations. For instance, a user could remote-in to operating system 820 from a remote operating system, in which case the user input supplied by the user would be communicated by the remote operating system to operating system 820. Similarly, operating system 820 would send the modified views to the remote operating system to be displayed.

FIG. 9 illustrates computing device 901 that is representative of any device or collection of devices in which the various processes, programs, services, and scenarios disclosed herein may be implemented. Examples of computing device 901 include, but are not limited to, mobile phones, tablets, laptops, desktops, watches and other wearable devices, and Internet of Things (IoT) devices. Some or all aspects of the various processes, programs, services, and scenarios disclosed herein may also be implemented on server computers, cloud computing platforms, and data center equipment, as well as any other type of physical or virtual server machine, container, and any variation or combination thereof.

Computing device 901 may be implemented as a single apparatus, system, or device or may be implemented in a distributed manner as multiple apparatuses, systems, or devices. Computing device 901 includes, but is not limited to, processing system 908, storage system 903, software 905, communication interface system 907, and user interface system 909. Processing system 908 is operatively coupled with storage system 903, communication interface system 907, and user interface system 909.

Processing system 908 loads and executes software 905 from storage system 903. Software 905 includes and implements focus assist process 906, which is representative of the focus assist processes discussed with respect to the preceding Figures. When executed by processing system 908 to enhance the user experience with respect to content capture experiences, software 905 directs processing system 908 to operate as described herein for at least the various processes, operational scenarios, and sequences discussed in the foregoing implementations. Computing device 901 may optionally include additional devices, features, or functionality not discussed for purposes of brevity.

Referring still to FIG. 9, processing system 908 may comprise a micro-processor and other circuitry that retrieves and executes software 905 from storage system 903. Processing system 908 may be implemented within a single processing device but may also be distributed across multiple processing devices or sub-systems that cooperate in executing program instructions. Examples of processing system 908 include general purpose central processing units, graphical processing units, application specific processors, and logic devices, as well as any other type of processing device, combinations, or variations thereof.

Storage system 903 may comprise any computer readable storage media readable by processing system 908 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 908 or possibly other systems.

Software 905 (including focus assist process 906) may be implemented in program instructions and among other functions may, when executed by processing system 908, direct processing system 908 to operate as described with respect to the various operational scenarios, sequences, and processes illustrated herein. For example, software 905 may include program instructions for implementing a focus assist process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 908.

In general, software 905 may, when loaded into processing system 908 and executed, transform a suitable apparatus, system, or device (of which computing device 901 is representative) overall from a general-purpose computing system into a special-purpose computing system customized to provide enhanced content capture capabilities. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, a conversational user interface, or any other type of user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
one or more computer readable storage media;
one or more processors operatively coupled with the one or more computer readable storage media; and
program instructions stored on the one or more computer readable storage media that, when executed by the one or more processors, direct the computing apparatus to at least:
receive a command to transition a user interface to a focus assist mode;
in response to the command, change one or more values of components of the user interface to affect a darkening of the components from a light aesthetic to a dark aesthetic;
receive a subsequent command to focus on one or more components of the components; and
in response to the subsequent command, change one or more color values of the one or more components from the dark aesthetic to the light aesthetic.

2. The computing apparatus of claim 1 wherein, to change the one or more color values of the one or more components from the dark aesthetic to the light aesthetic, the program instructions direct the computing apparatus to change the one or more color values of the one or more components to affect a lightening of the one or more components.

3. The computing apparatus of claim 2 wherein the one or more color values comprise values defined in a color space, wherein the color space comprises one of a red-green-blue (RGB) color space, a hue-saturation-lightness (HSL) color space; a hue-saturation-value/brightness (HSV/B) color space, and a cyan-magenta-yellow-key/black (CMYK) color space.

4. The computing apparatus of claim 3 wherein:
the command comprises a selection in the user interface of a button that triggers the transition to the focus assist mode;
the subsequent command comprises a subsequent selection in the user interface of the one or more components; and
the subsequent selection comprises one or more of: a click of a mouse, a hover action, and a box drawn around the one or more components.

5. The computing apparatus of claim 4 wherein:
the components comprise only a portion of the user interface; and
wherein the one or more components comprise only a subset of the components.

6. The computing apparatus of claim 4 wherein:
the components comprise an entirety of the user interface; and
wherein the one or more components comprise only a portion of the user interface.

7. The computing apparatus of claim 1 wherein the program instructions comprise an application feature, and the user interface comprises a user interface to a software application.

8. The computing apparatus of claim 1 wherein the program instructions comprise an operating system feature, and the user interface comprises a user interface to an operating system.

9. The computing apparatus of claim 1 wherein the program instructions comprise an operating system feature, and the user interface comprises a user interface to an application.

10. A method comprising:
changing one or more values of components of a user interface to affect a darkening of the components from a light aesthetic to a dark aesthetic;
receiving a command to focus on one or more components of the components; and
in response to the command, changing one or more color values of the one or more components from the dark aesthetic to the light aesthetic.

11. The method of claim 10 wherein changing the one or more color values of the one or more components from the dark aesthetic to the light aesthetic comprises changing the one or more color values of the one or more components to affect a lightening of the one or more components.

12. The method of claim 11 wherein the one or more color values comprise values defined in a color space, wherein the color space comprises one of a red-green-blue (RGB) color space, a hue-saturation-lightness (HSL) color space, a hue-saturation-value/brightness (HSV/B) color space, and a cyan-magenta-yellow-key/black (CMYK) color space.

13. The method of claim 12 wherein:
changing the one or more values of the components occurs in response to a selection in the user interface of a button that triggers a transition to a focus assist mode;
the command comprises a subsequent selection in the user interface of the one or more components; and the selection comprises one or more of: a click of a mouse, a hover action, and an area drawn around the one or more components.

14. The method of claim 13 wherein:
the components comprise only a portion of the user interface; and
wherein the one or more components of the user interface comprise only a subset of the components.

15. The method of claim 13
wherein the one or more components of the user interface comprise only a portion of the user interface.

16. One or more computer readable storage media having program instructions stored thereon that, when executed by a processing system; direct a computing apparatus to at least:
change one or more values of components of a user interface to affect a darkening of the components from a light aesthetic to a dark aesthetic;
receive a command to focus on one or more components of the components; and
in response to the command, change one or more color values of the one or more components to affect a lightening of the one or more components from the dark aesthetic to the light aesthetic.

17. The one or more computer readable storage media claim 16 wherein the one or more color values comprise values defined in a color space, wherein the color space comprises one of a red-green-blue (RGB) color space, a hue-saturation-lightness (HSL) color space, a hue-saturation-value/brightness (HSV/B) color space, and a cyan-magenta-yellow-key/black (CMYK) color space.

18. The one or more computer readable storage media of claim 16 wherein, to change the one or more color values of the one or more components from the dark aesthetic to the light aesthetic; the program instructions direct the computing apparatus to change the one or more color values of the one or more components to affect a lightening of the one or more components.

19. The one or more computer readable storage media of claim 16 wherein to change the one or more values of the components, the program instructions direct the computing apparatus to change the one or more values of the components in response to a selection in the user interface of a button that triggers a transition to a focus assist mode.

20. The one or more computer readable storage media of claim 19 wherein:
the command comprises a subsequent selection in the user interface of the one or more components; and
the subsequent selection comprises one or more of: a click of a mouse, a hover action, and an area drawn around the one or more components.

* * * * *